United States Patent
Ruh

(10) Patent No.: US 10,029,428 B2
(45) Date of Patent: Jul. 24, 2018

(54) APPARATUS AND METHOD FOR STRAIGHTENING FILAMENTS

(71) Applicant: KARL MAYER TEXTILMASCHINENFABRIK GmbH, Obertshausen (DE)

(72) Inventor: Michael Ruh, Muehlheim/Main (DE)

(73) Assignee: KARL MAYER TEXTILMASCHINENFABRIK GmbH, Obertshausen (DE)

(*) Notice: Subject to any disclaimer, the term of this patent is extended or adjusted under 35 U.S.C. 154(b) by 283 days.

(21) Appl. No.: 14/792,998

(22) Filed: Jul. 7, 2015

(65) Prior Publication Data
US 2016/0039156 A1  Feb. 11, 2016

(30) Foreign Application Priority Data
Aug. 6, 2014  (EP) .................................. 14179969

(51) Int. Cl.
| *B29C 71/02* | (2006.01) |
| *B29C 53/16* | (2006.01) |
| *D02J 13/00* | (2006.01) |
| *B29K 101/12* | (2006.01) |
| *B29L 31/00* | (2006.01) |

(52) U.S. Cl.
CPC .............. *B29C 71/02* (2013.01); *B29C 53/16* (2013.01); *D02J 13/001* (2013.01); *B29C 2071/022* (2013.01); *B29K 2101/12* (2013.01); *B29L 2031/731* (2013.01)

(58) Field of Classification Search
CPC ....................................................... B29C 71/02

USPC ......................................................... 264/346
See application file for complete search history.

(56) References Cited

U.S. PATENT DOCUMENTS

| 3,330,721 A | 7/1967 | Gould et al. |
| 3,606,689 A * | 9/1971 | Matsuo .............. D01D 10/0481 |
| | | 28/220 |
| 4,535,824 A | 8/1985 | Kerber et al. |
| 5,359,845 A | 11/1994 | Gabalda et al. |

(Continued)

FOREIGN PATENT DOCUMENTS

| CN | 1080967 | 1/1994 |
| DE | 199 20 177 | 11/1999 |

(Continued)

OTHER PUBLICATIONS

M. Itoh, et al. "Fiber reinforced plastics using a new heat-resistant silicon based polymer." Journal of Materials Science 37 (2002) p. 3795-3801.*

(Continued)

*Primary Examiner* — Matthew Daniels
*Assistant Examiner* — Hana Page
(74) *Attorney, Agent, or Firm* — Greenblum & Bernstein, P.L.C.

(57) ABSTRACT

An apparatus and method for straightening filaments. The apparatus includes a transport device for transporting filaments; a heating device including a heating channel forming a transport path for the filaments; and a cooling device arranged downstream of the heating device in a direction of transport, including a cooling channel that continues the transport path for the filaments. Cross-sectional areas of the heating channel and the cooling channel at least partially overlap.

12 Claims, 1 Drawing Sheet

(56) References Cited

U.S. PATENT DOCUMENTS

| | | | | |
|---|---|---|---|---|
| 5,404,706 A | * | 4/1995 | Ueno | D02G 1/02 57/284 |
| 2007/0042310 A1 | * | 2/2007 | Clark | B23P 6/002 432/77 |
| 2010/0287775 A1 | | 11/2010 | Bachmann et al. | |

FOREIGN PATENT DOCUMENTS

| | | |
|---|---|---|
| DE | 10 2007 052 594 | 7/2007 |
| EP | 0 568 467 | 11/1993 |
| JP | S57 73134 | 5/1982 |
| JP | H01-139838 | 6/1989 |
| JP | 1994-010230 | 1/1994 |
| JP | H08-267948 | 10/1996 |
| JP | 2001305353 | 10/2001 |

OTHER PUBLICATIONS

Don Kelley. "Fiberglass Plastics in Power Plants." Power Engineering (2007).*
Gerhard Koslowski, et al. English Translation of DE19920177. Published Nov. 18, 1999.*
European Search Report conducted in European Appln. No. 141 79 969.2-1303 (dated Nov. 6, 2014) (w/ English language translation).
Canada Office Action conducted in Canada Appln. No. 2,896,008 (dated Aug. 3, 2016).
China Office Action conducted in China Appln. No. 201410599546.3 (dated Dec. 26, 2016).
Korea Office Action conducted in Korea Appln. No. 10-2015-0098992 (dated Nov. 25, 2016) (w/ English translation).

* cited by examiner

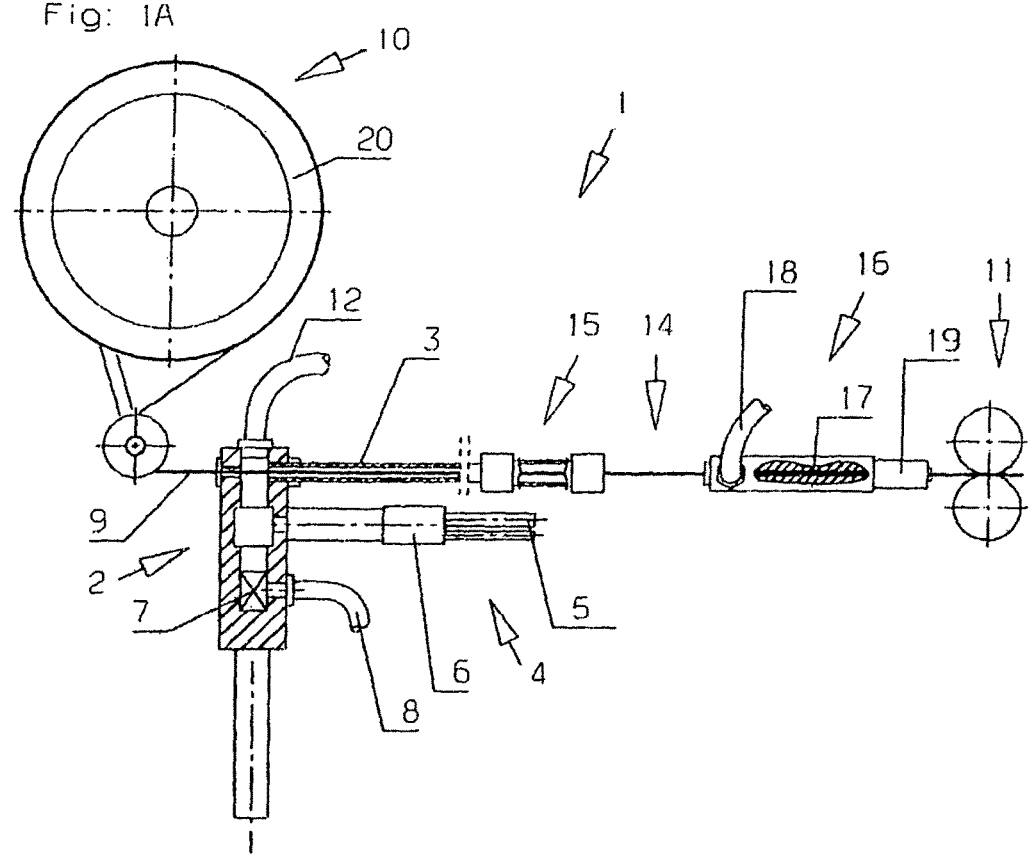
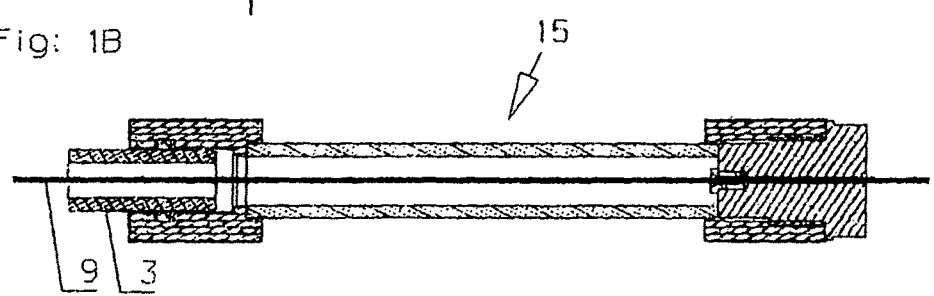
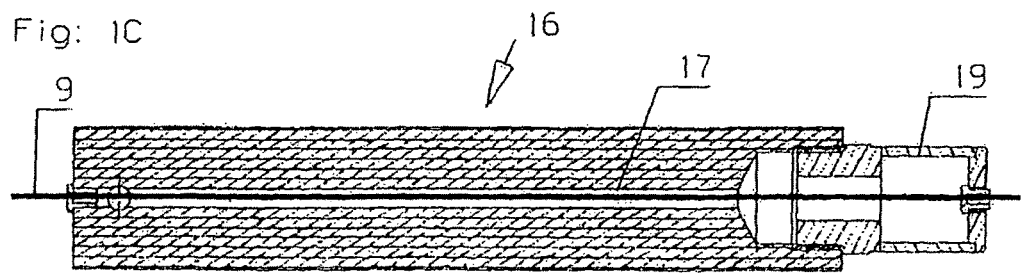

APPARATUS AND METHOD FOR STRAIGHTENING FILAMENTS

CROSS-REFERENCE TO RELATED APPLICATIONS

The present application claims priority under 35 U.S.C. § 119 of European Patent Application No. 14 179 969.2 filed Aug. 6, 2014, the disclosure of which is expressly incorporated by reference herein in its entirety.

BACKGROUND OF THE EMBODIMENTS

1. Field of the Invention

Embodiments relate to an apparatus for straightening filaments, in particular, plastic monofilaments, with a transport device for transporting the filaments and a heating device including a heating channel that forms a transport path for the filament.

Embodiments further relate to a method for producing straightened filaments, in particular, plastic monofilaments, in which a filament is continuously transported through a heating channel of a heating device by a transport device and the heating channel is heated during the continuous transport of the filament through the heating channel.

2. Discussion of Background Information

Straightened filaments, in particular plastic monofilaments, are used, e.g., as fixing wires in the production of spiral screens or coil screens. These screens are produced in a two-stage process. First, coils are wound from monofilaments and stored intermediately. The coils are then deposited so that their cross-sectional surfaces partially overlap in a separate process. Fixing wires are inserted into the region of overlap produced. These wires serve as a hinge and produce a connection between the coils. In this manner, the coils are assembled to form a screen.

Plastic monofilaments that are made of thermoplastic materials are particularly preferred as fixing wires. These are typically delivered and stored wound on spools. With this type of storage, however, the filaments adopt the curved shape of the spool, which shape is also partially preserved following the unwinding. The further processing of the filaments to form fixing wires is, however, hindered by this residual curvature. It must be eliminated according to the given process-related requirements. This procedure is referred to as the straightening of the filaments.

The approach according to the prior art provides for the filaments that are to be used as fixing wires to be guided through holes of a heated metallic heating block before the insertion operation into the coils. Heating blocks of this type are, however, thermally sluggish and only react to intended temperature changes very gradually. This results in a dilemma in the production of straightened filaments.

On the one hand, the filament comprises sections which differ in the amounts of heat absorbed. In the production of coil screens, it is necessary occasionally to cut to length the filament used as a fixing wire. Additionally, the screen joining process, and therefore also the insertion operation, proceed discontinuously. In this process, an idle state of the filament occurs in the heating block. The amounts of heat absorbed during the idle state of the filament in the heating block thus differ from the amounts of heat that the filament absorbs during the continuous insertion operation. On the other hand, an overheating of the sections heated in the idle state of the filament must be prevented. An overheating would lead to irreversible material damage.

The temperature of the heating block must therefore be chosen so that it is high enough for a sufficient heating to take place in the continuous pass-through of the filaments on the one hand. On the other hand, the temperature must be selected so that it is low enough so that no irreversible material damage occurs in the idle state of the filaments. The necessity of finding a compromise between these requirements leads to straightening results of the filaments of a merely limited quality.

The document DE 10 2007 052 594 B4 and its family member U.S. Patent Publication No. 2010/0287775 relate to a method and an apparatus for producing coil screens. The disclosures of these documents are expressly incorporated by reference herein it their entireties An automated production method for coil screens is disclosed. The coils are produced by a winding device arranged moveably above a working surface. Through a movement of a joining device on this working surface, they are then connected to one another by the insertion of a fixing wire.

In an automated joining operation, it is, unlike a manual joining process, necessary to work with straightened filaments of high quality. The process of straightening of the filaments is also time-critical. In the sequence of the production process, only a defined window of time is available within which the straightened fixing wire can be inserted. During the required cutting-to-length of the fixing wire, and outside of the window of time available for the insertion, there consequently results an idle state of the fixing wire in the heating block and the absorption of an increased amount of heat by the filament. The absorption of the increased amount of heat, however, leads to an irreversible damaging of the material.

Furthermore, an intermediate storage of a straightened filament that is to be used as fixing wire is not expedient. An intermediate storage of this type would require another diversion and thus a bending of the previously straightened filament. The quality of the straightening result would thus be reduced.

SUMMARY OF THE EMBODIMENTS

Embodiments of the present invention provide straightened filaments, in particular plastic monofilaments, of a high quality of straightness.

According to embodiments, an apparatus of the type named at the outset includes a cooling device arranged after the heating device in a direction of transport. The cooling device comprises a cooling channel that continues the transport path for the filament. Cross-sectional areas of the heating channel and the cooling channel at least partially overlap.

The filament that is to be straightened is arranged and received in the heating channel of the heating device. The heating channel thereby forms a transport path for the filament. On this transport path, heat is applied to the filament via a heating device. The filament can thereby in particular be embodied or formed as a plastic monofilament. The monofilament is also preferably formed from thermoplastic material. The amount of heat absorbed results in a plastic deformability of the filaments. The filaments are transported through the heating channel via the transport device and can thus be straightened. The plastic deformability of the filaments caused by the application of heat is reversible. In order to fix the straight alignment of the filaments, the filaments are transported into a cooling device by the transport device. In the cooling device, the filaments are received in a cooling channel. This cooling channel thus continues the transport path for the filament out of the heating channel. In order to achieve a straightening result of high quality, the filament cannot be allowed to bend during this process. The cross-sectional areas of the heating channel and the cooling channel at least partially overlap. It is thus possible to transport the filament in a constantly straight alignment both through the heating channel and also through the cooling channel. Straightened filaments of high quality can be provided.

It is thereby preferred that the heating device comprises a first gas supply device by which hot gas can be admitted to the heating channel, particularly under pressure in an axial direction. The application of heat to the heating channel occurs by admission of hot gas to the heating channel. The hot gas is provided by a first gas supply device of the heating device. The hot gas can thereby be conducted through the heating channel, particularly under pressure in an axial direction. The filament is thus surrounded by a flow of hot gas in an axial direction at a high flow rate. This leads to an efficient absorption of the amount of heat provided. The result is a rapid heating of the filament. The admission of hot gas to the heating channel is also advantageous compared to the use of a heated metallic heating block. Compared to the metallic heating block, the temperature of the gas used can be changed without the occurrence of long reaction times. Intended temperature changes in the heating channel can thus be achieved quickly.

Preferably, the heating device comprises a bypass and a switchover device. The admission of hot gas to the heating channel can be switched over to an admission of the hot gas to the bypass via the switchover device. With the use of the switchover device, the application of heat to the heating channel can thus be stopped roughly simultaneously with the admission of the hot gas to the bypass. This results in two advantages. On the one hand, the absorption of amounts of heat during an idle state of the filament in the heating channel can be avoided in that the hot gas from the heating channel is redirected into the bypass via the switchover device. On the other hand, the gas used can be left at the preset temperature. A heating or cooling of the gas heating device used is not necessary. A heating or cooling of this type would also be technically complex and could only be achieved with difficulty in the short window of time available in some circumstances. The renewed admission of hot gas to the heating channel is thereby possible without a problem via a switching over of the admission of the hot gas to the bypass to an admission of the hot gas to the heating channel using the switchover device. The switchover device can be embodied or formed as a switchover valve, for example.

Preferably, the heating device comprises a second gas supply device by which cold gas can be admitted to the heating channel, particularly under pressure in an axial direction. Cold gas can be admitted to the heating channel as the hot gas from the heating channel is being redirected into the bypass via the switchover device. The previous admission of hot gas to the heating channel leads to both the filament and the inner wall of the heating channel absorbing a certain amount of heat. Once the admission of hot gas to the heating channel is interrupted, this amount of heat is at least partially emitted to the interior of the heating channel. The additional amount of heat introduced into the heating channel causes an additional undesired heating of the filament. The admission of cold gas to the heating channel during the idle state of the filament prevents an overheating of the filament due to the remaining residual heat. The surrounding of the filament with a flow of cold gas under pressure in an axial direction results in an efficient cooling of the heating channel and therefore of the filament.

It is thereby preferred that the cooling device comprises a third gas supply device by which cold gas can be admitted to the cooling channel, particularly under pressure in an axial direction. The third gas supply device thus provides cold gas in order to cool the filament in the cooling channel. The filament is surrounded by a flow of cold gas in an axial direction at a high flow rate. This results in a suitable heat dissipation of the filament. This leads to a rapid cooling of the filament. The straight alignment of the filament is thus fixed.

Preferably, the heating channel is formed from a material having a low specific heat capacity and a low coefficient of thermal conductivity, in particular from fiberglass-reinforced plastic or silicate foam. The admission of hot gas to the heating channel leads to both the filament and the inner wall of the heating channel absorbing a certain amount of heat. This amount of heat can, after a switchover of the admission of hot gas to the heating channel to an admission of the hot gas to the bypass, be dissipated again from the wall to the interior of the heating channel. The filament would thus absorb an additional amount of heat. A sectionwise overheating of the straightened filament would be the result. Accordingly, the amount of heat introduced into the inner wall of the heating channel should be kept small. Therefore, the channel is formed from a material with a low specific heat capacity and a low coefficient of thermal conductivity. For example, fiberglass-reinforced plastics or silicate foams can be considered for this purpose.

Preferably, the heating channel has drag coefficients which are matched to the drag coefficients of the bypass. The first gas supply device can thus be continuously operated under unchanging operating conditions. A switchover of the admission of hot gas to the heating channel to an admission of the hot gas to the bypass is possible without difficulty using the switchover device. In particular, it is not necessary to change the flow rate of the gas provided by the first gas supply device.

It is also preferred that, between the heating device and the cooling device, a recess is arranged which continues the transport path for the filament. The filament can thus be transported from the heating channel into the recess and subsequently into the cooling channel. The heating channel, recess and cooling channel are thus arranged one after another in an axial direction. A straight transport of the filament is rendered possible. Furthermore, the hot gas that is admitted to the heating channel can escape at the end of the heating channel facing the recess. A penetration of the hot gas into the cooling channel is avoided.

It is thereby preferred that, at an end of the heating channel facing the recess, a first noise reducing device is arranged which comprises a continuation of the transport path for the filament, and/or that at an end of the cooling device facing away from the recess, a second noise reducing device is arranged which comprises a continuation of the transport path for the filament. The hot gas that is admitted to the heating channel escapes radially therefrom at the end of the heating channel. The gas stream exits the heating channel at a high flow rate and dissipates. As a result, a high exposure of the surrounding environment to noise occurs. The first noise reducing device provided according to the invention acoustically mutes the dissipation of the escaping gas. The exposure of the surrounding environment to noise can be reduced accordingly. At the same time, it is possible to transport the filament from the heating channel into the recess through the first noise reducing device and to subsequently transport it into the cooling channel. The transport path of the filament is continued out of the heating channel into the first noise reducing device. To enable a radial exiting of the hot gas, the first noise reducing device can be at least partially formed from porous sintered bronze. The stream of cold gas that is admitted to the cooling channel exits the cooling channel at a high flow rate and then dissipates. As a result, a high exposure of the surrounding environment to noise occurs. The second noise reducing device acoustically mutes the dissipation of the escaping cold gas. The cold gas escapes radially from the second noise reducing device. The exposure of the surrounding environment to noise can be reduced accordingly. At the same time, it is possible to transport the filament out of the cooling channel through the second noise reducing device. The transport path of the filament is continued out of the cooling channel into the second noise reducing device. To enable a radial exiting of the cold gas, the second noise reducing device can be at least partially formed from porous sintered bronze.

In embodiments, a method of the type named at the outset includes, after the heating device, transporting the filament through a cooling channel of a cooling device in a direction of transport. The cooling channel is cooled, and cross-sectional areas of the heating channel and the cooling channel at least partially overlap.

The filament is continuously transported through the heating channel via a transport device as heat is applied to this channel. In this manner, the amount of heat which is needed to achieve the plastic deformability of the filaments is provided. The heated filaments are transported through the heating channel under tensile force via a transport device. As a result, the curvature imparted onto the filaments by the storage on spools is eliminated and the filaments are straightened. After the heating channel, the filament is transported in a direction of transport through a cooling channel in which it is cooled. Through this cooling, the straight alignment of the filament is fixed. In order to avoid a bending of the filament during the transport through the heating channel and the cooling channel, the cross-sectional areas of the heating channel and the cooling channel at least partially overlap. A shared transport path is formed between the heating channel and the cooling channel. On this path, the filament can be transported from the heating channel into the cooling channel in a straight line. Straightened filaments of high quality can be provided.

It is thereby preferred that the heating channel is heated by an admission of hot gas, particularly under pressure in an axial direction, via a first gas supply device that provides the hot gas. This gas is introduced into the heating channel, particularly under pressure and in an axial direction. There, the hot gas flows about the filament in an axial direction at a high flow rate. The result is a suitable heat transfer from the gas to the filament. A rapid heating of the filament occurs. It is also advantageous that hot gas, unlike the heating blocks used according to the prior art, exhibits a shorter thermal reaction time. The use of hot gas allows quicker temperature changes than the contact heat of thermally sluggish heating blocks.

Here, it is preferred that the admission of hot gas to the heating channel is started synchronously with the transport of the filament into the heating channel. An unnecessary application of heat to the heating channel is avoided for as long as a filament section is idle in the heating channel. An unnecessary input of amounts of heat into the idle filament section and the wall of the heat channel is prevented. In addition, the synchronous admission of hot gas to the heating channel at the start of the transport of the filament into the heating channel enables an even heating of the filament.

Preferably, the admission of hot gas to the heating channel is redirected into a bypass synchronously with an idle state of the filament via a switchover device. A further heating of the filament during the idle state in the heating channel is avoided. The hot gas being admitted to the heating channel is redirected into a bypass. The filament is then in an idle state in the region of the heating and cooling channels. The overheating of the filament can be prevented by the sudden cutoff of the heat supplied to the heating channel. There is also no longer the necessity of a sudden switching-on and/or switching-off of the first gas supply device. The device can be continuously operated under unchanging operating conditions. If the transport of the filament through the heating channel is restarted, the admission of heated gas to the bypass can be switched over to an admission of the hot gas to the heating channel by means of the switchover device. The amount of heat introduced into the filament can thus be precisely controlled. In this manner, straightened filaments of high quality can be produced.

It is thereby preferred that, synchronously with the redirection of the admission of hot gas to the heating channel into the bypass, cold gas is admitted to the heating channel, particularly under pressure in an axial direction, via a second gas supply device. It is prevented that the residual heat still located in the heating channel heats the filament that is also still located there more intensively than is the case in the continuous transport of the filament through the heating channel. A defined input of heat into the filament can occur.

Preferably, the cooling channel is cooled by an admission of cold gas, in particular under pressure in an axial direction, via a third gas supply device. The cooled filament is no longer plastically deformable. The straight alignment of the filament in the heating channel resulting from plastic deformation, which is rendered possible by the heat input, can thus be fixed. The cold gas is introduced into the cooling channel under pressure in an axial direction. It flows about the filament at a high flow rate, whereby a suitable heat transfer from the filament to the surrounding gas is enabled. A rapid cooling of the filament occurs. After exiting from the cooling channel in the direction of transport, the filament is completely straightened. It can then be used as a fixing wire in the production of coil screens, for example.

Finally, it is preferred that a recess is arranged between the heating channel and the cooling channel, and wherein at an end of the heating channel facing the recess, a first noise reducing device is arranged through which the filament is transported, and/or that at an end of the cooling device facing away from the recess, a second noise reducing device is arranged through which the filament is transported. Hot gas is admitted to the heating channel under pressure in an axial direction. This gas exits into the recess radially at the end of the heating channel. The dissipation of the gas stream flowing at a high flow rate would lead to an increased exposure of the surrounding environment to noise. The first noise reducing device serves to acoustically mute the exiting gas stream. At the same time, however, the filament can be transported through the first noise reducing device. The transport path of the filament is thus continued into the first noise reducing device from the heating channel, then into the recess and finally into the cooling channel. This transport path is thereby arranged such that the filament is aligned in a straight line over the entire extension of the transport path. In this manner, a straightened filament of high quality can be provided. Cold gas is admitted to the cooling channel under pressure in an axial direction. This gas exits out of the second noise reducing device radially at the end of the cooling channel. This device serves to acoustically mute the exiting gas stream. The transport path of the filament is continued out of the cooling channel into the second noise reducing device.

Embodiments of the invention are directed to an apparatus for straightening filaments that includes a transport device for transporting filaments; a heating device comprising a heating channel forming a transport path for the filaments; and a cooling device arranged downstream of the heating device in a direction of transport, comprising a cooling channel that continues the transport path for the filaments. Cross-sectional areas of the heating channel and the cooling channel at least partially overlap.

According to embodiments, the filaments can be plastic filaments.

In accordance with embodiments, the heating device can further include a first gas supply device structured and arranged to admit a hot gas flow to the heating channel. The heating device may further include a second gas supply device structured and arranged to admit a cold gas flow to the heating channel. The cooling device can further include a third gas supply device structured and arranged to admit a cold gas flow to the cooling channel. At least one of the first gas supply device, the second gas supply device and the third gas supply device can be structured and arranged to admit its respective gas under pressure in an axial direction of its respective channel.

In embodiments, the heating channel can be formed from a material having a low specific heat capacity and a low coefficient of thermal conductivity. The material can be fiberglass-reinforced plastic or silicate foam.

According to other embodiments, wherein the heating device can further include a bypass and a switchover device structured and arranged to switch the hot gas flow from the heating channel to the bypass. The heating channel has drag coefficients matched to drag coefficients of the bypass.

In further embodiments, the apparatus can also include a recess, which is arranged between the heating device and the cooling device, and through which the transport path for the filament extends. The apparatus can also include at least one of: a first noise reducing device, which can be located at an end of the heating channel facing the recess, and which can be structured to continue the transport path for the filament, and a second noise reducing device, which can be located at an end of the cooling device opposite the recess, and which can be structured to continue the transport path for the filament.

Embodiments of the invention are directed to a method for producing straightened filaments. The method includes transporting, in a direction of transport, a filament through a heating channel of a heating device via a transport device; heating the heating channel during the transporting of the filament through the heating channel; and transporting, in the direction of transport, the heated filament through a cooling channel of a cooled cooling device. Cross-sectional areas of the heating channel and the cooling channel at least partially overlap.

According to embodiments, the heating channel can be heated by admitting a hot gas flow via a first gas supply device. The hot gas flow can be admitted to the heating channel synchronously with the transport of the filament into the heating channel. Further, in an idle state in which the filament is not being transported through the heating channel, the method may further include switching the hot gas flow from the heating channel into a bypass via a switchover device. Moreover, synchronously with the switching of the hot gas flow into the bypass, the method can also include admitting a cold gas flow to the heating channel via a second gas supply device.

In accordance with other embodiments, the method can include cooling the cooling channel by admitting a cold gas flow via a third gas supply device.

In embodiments, a recess can be arranged between the heating channel and the cooling channel, and the method can also include at least one of: transporting the filament through a first noise reducing device located at an end of the heating channel, and transporting the filament through a second noise reducing device located at an end of the cooling channel opposite the recess.

In accordance with still yet other embodiments of the present invention, the filaments can be plastic filaments.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1A shows a section of an apparatus for straightening filaments;

FIG. 1B shows a detailed section of first noise reducing device depicted in FIG. 1A; and FIG. 1C shows a detailed section of the cooling device depicted in FIG. 1A.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1A shows an apparatus 1 with a heating device 2. Heating device 2 comprises a heating channel 3, a first gas supply device 4 with a first gas supply 5, and a gas heating device 6. Heating device 2 also comprises a switchover device 7 and a bypass 8.

A filament 9 to be straightened is drawn off a supply spool 20 via a restrained dereeler 10 and transported through heating channel 3 via a transport device that is embodied or formed by, e.g., a transport roller pair 11.

Synchronously with the transport of filament 9 into heating channel 3, hot gas is admitted to heating channel 3 via first gas supply device 4, which is connected to a first gas supply 5. This gas is heated in or by gas heating device 6 to be warmed up to a defined temperature. The hot gas is then introduced into heating channel 3 and flows through heating channel 3 under pressure in an axial direction. Simultaneously with the introduction of the gas into heating channel 3, filament 9 is transported or drawn through heating channel 3. In this way, an even input of heat into filament 9 results. The hot gas flows about filament 9 at a high flow rate and with a surrounding flow that increases the efficiency of the input of heat into filament 9. Consequently, a rapid heating of filament 9 occurs.

During an idle state of filament 9 in the heating channel 3, a cutoff of the heating energy supplied to heating channel 3 is necessary, and preferably a sudden cutoff is executed, since irreversible damage to filament 9 can otherwise occur. For this purpose, a switchover device 7 is arranged to switch or divert the flow of hot gas through first gas supply device 4 from heating channel 3 to a bypass 8. Switchover device 7 can thereby be embodied or formed, e.g., as a switchover valve. After actuation of switchover device 7, the hot gas is no longer conducted or directed through heating channel 3, but rather is conducted or directed through bypass 8. Further, bypass 8 is designed to have drag coefficients matched to heating channel 3. In this way, first gas supply device 4 can be continuously operated under unchanging operating conditions. In other words, it is not necessary to change the flow rate or temperature of the gas, nor is there need for a sudden switching-on and/or switching-off of first gas supply device 4, which would be technically problematic.

The admission of cold gas to heating channel 3 occurs synchronously with the switchover from the admission of hot gas to heating channel 3 to the admission of the hot gas to bypass 8. This admission of cold gas occurs from a second gas supply device 12 via a second gas supply through which the cold gas is conducted into heating channel 3. Thus, it is not possible for residual heat still located in heating channel 3 to be introduced into the idle filament 9. Thus, filament 9 in the idle state is not heated more intensively than filament 9 as it is continuously transport through heating channel 3. Therefore, filament 9 is reliably heated to a defined temperature in heating channel 3.

As hot gas is admitted to heating channel 3, a certain amount of heat can be introduced into the wall of heating channel 3. This amount of heat can, when hot gas is no longer admitted to the heating channel 3, i.e., switchover device 7 has diverted the hot gas to bypass 8, at least partially contribute to a further heating of filament 9. To keep this additional heating as low as possible, the heating channel 3 will be formed from a material that exhibits a low specific heat capacity and a low coefficient of thermal conductivity. In this way, the amount of heat input into the wall of heating channel 3 can be kept small, and an additional heating of filament 9, when hot gas is not being admitted to heating channel 3, can be avoided. Heating channel 3 can be formed from, e.g., fiberglass-reinforced plastic. Further, silicate foams may also be advantageously utilized as the material for heating channel 3.

After passing through heating channel 3, filament 9 exits heating channel 3 in the direction of transport and enters into a recess 14, which allows for a straight continuation of the transport path of heating channel 3. At the end of heating channel 3, the hot gas conducted through heating channel 3 under pressure also exits in an axial direction. The gas stream propagated through heating channel 3 at a high flow rate begins to dissipate in recess 14. An increased exposure of the surrounding environment to noise results therefrom. For this reason, a first noise reducing device 15 can be provided in recess 14 at the end of heating channel 3. First noise reducing device 15 serves to acoustically mute the dissipating gas stream, while the exiting gas escapes radially from first noise reducing device 15. At the same time, it is possible to continue the straight transport path of filament 9 through heating channel 3 in first noise reducing device 15. Filament 9 must not be bent while being transported through the first noise reducing device 15.

FIG. 1B shows a detailed view of the first noise reducing device 15.

On a side of recess 14 opposite first noise reducing device 15 is a cooling device 16. By this arrangement, the exit and separation of the hot gas from cooling device 16 are simultaneously rendered possible by recess 14. Cooling device 16 includes a cooling channel 17, which continues the transport path of filament 9 out of recess 14 in a straight line. Thus, cross-sectional areas of heating channel 3 and cooling channel 17 at least partially overlap such that the transporting of filament 9 in a straight line is rendered possible by or through both channels 3 and 17.

Filament 9, which was heated in heating channel 3, thus enters into cooling channel 17 after passing through recess 14. Cold gas is admitted or conducted to and through cooling channel 17, preferably under pressure and in an axial direction, from a third gas supply device 18 via a third gas supply. During the transport of filament 9 through cooling channel 17, filament 9 is surrounded by a flow of cold gas at a high flow rate. Consequently, a suitable heat transfer from filament 9 to the cold gas occurs to effect a rapid cooling of filament 9. Through the cooling of filament 9, the plastic deformability filament 9 is lost. Thereby, the straight alignment of filament 9 is fixed.

After passing through cooling channel 17, filament 9 exiting cooling device 16 in the direction of transport is completely straightened. It can thus then be used, e.g., as a fixing wire in the production of spiral screens or coil screens.

A second noise reducing device 19 can also be provided at the end of cooling channel 17. Like first noise reducing device 15, second noise reducing device 19 also serves to acoustically mute the dissipating gas stream, while the exiting gas escapes radially from second noise reducing device 19. The transport of filament 9 in a straight line through cooling channel 17 can be continued in second noise reducing device 19. In particular, filament 9 must not be bent during the transport through second noise reducing device 19.

FIG. 1C shows a detailed view of cooling device 16, as well as second noise reducing device 19.

If the straightened filament 9 is used for the production of fixing wires for coil screens, an exemplary process would proceed as follows: filament 9 is drawn off of a supply spool 20 by restrained dereeler 10. Filament 9 is transported through heating channel 3 of heating device 2 by transport roller pair 11. Synchronously with the introduction of filament 9 into heating channel 3, hot gas is admitted to heating channel via first gas supply device 4. At the end of heating channel 3 that faces recess 14, filament 9 exits heating channel 3 and is transported through recess 14. However, filament 9 exiting heating channel 3 can optionally be transported through first noise reducing device 15 arranged at the end of heating channel 3 in recess 14. The transport path of filament 9 is continued in a straight line from heating channel 3, into and through recess 14, including the transport through optional first noise reducing device 15, and into cooling channel 17 of cooling device 16. Cold gas is admitted to cooling channel 17, whereby filament 9, which was heated in heating channel 3, is now cooled in cooling channel 17. As a result, the straight alignment of filament 9 is fixed. Thus, when filament 9 exits cooling channel 17, or exits optional second noise reducing device 19 arranged at the end of cooling channel 17 opposite recess 14, filament 9 is completely straightened. Then, after exiting cooling channel 17 or second noise reducing device 19, the straight filament 9 can be inserted directly into coils which have been provided for producing a coil screen.

For the production of a coil screen, a filament 9 of a certain predetermined length is required. Once a filament 9 of this length has been inserted into the coil screen, filament 9 must be cut to length. For this purpose, i.e., to perform the cutting-to-length operation, it is necessary to at least briefly interrupt the transport of filament 9. Apparatus 1 (or the corresponding arrangement of coils) must also be moved further for the next insertion operation. Outside of the window of time available for the insertion operation, and during the cutting-to-length, an idle state of filament 9 occurs in heating channel 3.

Simultaneously with this idle state, the admission of hot gas to heating channel 3 is switched over to an admission of the hot gas to bypass 8 via switchover device 7. At this time, cold gas is also synchronously admitted to heating channel 3 via second gas supply 12 via the second gas supply device (not illustrated). In this manner, first gas supply device 4 is operated under unchanging operating conditions during the idle state of filament 9 in heating channel 3. Therefore, residual heat remaining in heating channel 3 cannot contribute to an additional heating of filament 9. After filament 9 has been cut to length in accordance with the requirements and/or the apparatus 1 (or, if necessary, the coils that are to be connected) has been moved further for the next insertion operation, switchover device 7 is once again actuated, whereby the admission of the hot gas from the first gas supply device 4 to bypass 8 is switched over to admit the hot gas to heating channel 3. Thus, the described procedure begins anew. This procedure can be repeated as often as desired so that this process of straightening filaments 9 can be run discontinuously in this manner.

Filaments 9 that are to be straightened can be, e.g., plastic monofilaments. Particularly, a thermoplastic material can be used for the monofilaments. With the method according to the invention and the apparatus 1 according to the invention, straightened filaments 9, particularly plastic monofilaments, of a high quality of straightness can be produced.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A filament straightening apparatus, comprising:
   a filament conveyor configured for transporting filaments;
   a heating device comprising a heating channel forming a transport path for the filaments; and
   a cooling device arranged downstream of the heating device in a direction of transport, comprising a cooling channel that continues the transport path for the filaments,
   wherein cross-sectional areas of the heating channel and the cooling channel at least partially overlap,
   wherein the heating device further comprises a first gas supply device structured and arranged to admit a hot gas flow to the heating channel, and
   wherein the heating device further comprises a bypass and a switchover device structured and arranged to switch the hot gas flow from the heating channel to the bypass.

2. The apparatus according to claim 1, wherein the filaments are plastic filaments.

3. The apparatus according to claim 1, wherein the heating device further comprises a second gas supply device structured and arranged to admit a cold gas flow to the heating channel.

4. The apparatus according to claim 3, wherein the cooling device further comprises a third gas supply device structured and arranged to admit a cold gas flow to the cooling channel.

5. The apparatus according to claim 4, wherein at least one of the first gas supply device, the second gas supply device and the third gas supply device is structured and arranged to admit its respective gas under pressure in an axial direction of its respective channel.

6. The apparatus according to claim 1, wherein the heating channel is formed from a material having a specific heat capacity and a coefficient of thermal conductivity so that a further heating the filament after the hot gas has been diverted to the bypass.

7. The apparatus according to claim 6, wherein the material comprises fiberglass-reinforced plastic or silicate foam.

8. The apparatus according to claim 1, wherein the heating channel has drag coefficients matched to drag coefficients of the bypass.

9. The apparatus according to claim 1, further comprising a recess, which is arranged between the heating device and the cooling device, and through which the transport path for the filament extends.

10. The apparatus according to claim 9, further comprising at least one of:
    a first noise reducing device, which is located at an end of the heating channel facing the recess, and which is structured to continue the transport path for the filament, and
    a second noise reducing device, which is located at an end of the cooling device opposite the recess, and which is structured to continue the transport path for the filament.

11. The apparatus according to claim 1, wherein the filament conveyor comprises a transport roller pair.

12. A method for producing straightened filaments in a filament straightening apparatus, wherein the filament straightening apparatus comprises:
    a filament conveyor configured for transporting filaments;
    a heating device comprising a heating channel forming a transport path for the filaments; and
    a cooling device arranged downstream of the heating device in a direction of transport, comprising a cooling channel that continues the transport path for the filaments,
    wherein the cross-sectional areas of the heating channel and the cooling channel at least partially overlap,
    wherein the heating device further comprises a first gas supply device structured and arranged to admit a hot gas flow to the heating channel, and wherein the heating device further comprises a bypass and a switchover device structured and arranged to switch the hot gas flow from the heating channel to the bypass, the method comprising:

transporting, in a direction of transport, a filament through the heating channel of the heating device via the filament conveyor;

heating, via the hot gas flow from the first gas supply, the heating channel during the transporting of the filament through the heating channel;

transporting, in the direction of transport, the heated filament through the cooling channel of the cooled cooling device; and switching, via the switchover device, the hot gas flow from the heating channel to the bypass.

* * * * *